S. J. AUSTIN.
Platform Scales.

No. 163,440.

Patented May 18, 1875.

ATTEST:
Robt Burns.
Henry Tanner.

INVENTOR:
Stephen J. Austin
By Knight Bro.
Attys.

THE GRAPHIC CO. PHOTO-LITH. 39 & 41 PARK PLACE, N.Y.

UNITED STATES PATENT OFFICE.

STEPHEN J. AUSTIN, OF ST. LOUIS, MISSOURI.

IMPROVEMENT IN PLATFORM-SCALES.

Specification forming part of Letters Patent No. 163,440, dated May 18, 1875; application filed April 12, 1875.

*To all whom it may concern:*

Be it known that I, STEPHEN J. AUSTIN, of St. Louis, St. Louis county, State of Missouri, have invented a certain Improvement in Platform-Scales, of which the following is a specification:

My improvement consists, first, in the provision of bearing-rollers between the plates or pieces constituting the bearing of the platform upon the knife-edges of the lever, so as to equalize the strain upon the whole length of the knife edge, as hereinafter described, and prevent wear. The second part of my improvement consists in the combination of such rollers with open or perforated bearings, to prevent the accumulation of dust on the roller-bearings. The third part of my improvement consists in bevel-flanges on the ends of such rollers to prevent their endwise movement in their bearings. The fourth part of my improvement consists in the forming of the knife-edge-bearing recessss with closed ends, that prevent the endwise derangement of the bearing upon the knife-edge.

Figure 1:
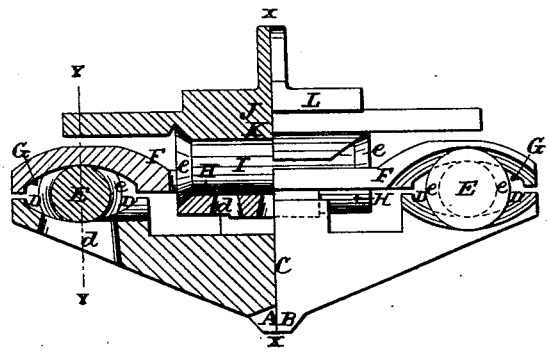
Figure 2:
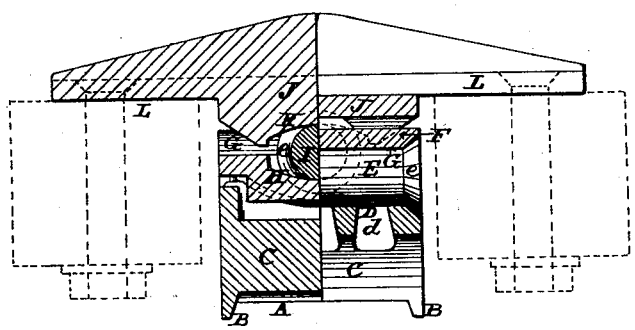

In the drawings, Figure 1 is a view one-half in side elevation and one-half in longitudinal vertical section. Fig. 2 is a view one-half in section at $x$ $x$ and one-half in section at Y Y, Fig. 1.

A is the recess or saddle which receives the usual knife-edge, upon one of the levers upon which the platform rests. At each end of this saddle-recess is a projection, B, which prevents the saddle from moving endwise upon the knife-edge, so as to have unequal bearing thereon. $c$ is the saddle-piece in whose lower part the knife-edge recess is formed. This piece has upon the upper side and near each end rounded concavities D, forming bearings for the rollers E E. Upon these rollers rests a piece, F, having concavities G upon the under side, forming the bearings upon the rollers E E. The piece F upon the upper side has a concavity, H, forming the lower bearing of the roller I, whose axis extends in a line at right angles to the axis of the rollers E E. Upon the roller I rests the bracket-piece J, to which the platform-timbers are secured. The piece J has upon its under side a concavity, K, forming its bearing on the roller I. The lower bearings D D and H are slotted through the metal transversely to the rollers, to allow the free escape of dirt from the bearings. The slots are shown at $d$. At the ends of the bearing-rollers E E I are flanges $e$, to prevent the derangement of parts in directions of the length of the rollers. From the sides of the bracket-piece extend wings L, to which the timbers of the platform are secured. These may lie on top of the bracket-piece, or they may be secured to the under side of the wings, as shown in dotted lines in Fig. 2. The advantage gained by the latter construction is that the platform-bearings are more compact, the top of the platform being brought down nearer to the level of the knife-edge bearings.

It will be observed that with my improvement the platform has the necessary freedom of movement within its frame, and yet that there is no objectionable strain on the knife-edges and bearing-attachments, as would be the case if the rollers were absent.

I claim as my invention—

1. The combination of bearing-pieces C F J and rollers E E I, substantially as and for the purpose set forth.

2. In combination with the rollers E E I and pieces C F J the roller-bearings D D H having perforations $d$ to allow escape of dirt from the bearings.

3. In combination with the rollers E E I and pieces C F J the bevel-flanges $e$, to prevent derangement of the parts, as set forth.

4. The projections B, in combination with the saddle-piece C and recessed knife-edge bearing A, to prevent endwise movement of the saddle on the knife-edge.

5. The combination of bearing-pieces C F J, rollers E E I, knife-bearing A, and bracket-wings L, for attachment of the platform-timbers, substantially as set forth.

STEPHEN J. AUSTIN.

Witnesses:
SAML. KNIGHT,
ROBERT BURNS.